(12) United States Patent
Iitsuka

(10) Patent No.: US 6,451,514 B1
(45) Date of Patent: Sep. 17, 2002

(54) METHOD FOR FORMATION OF UPPER MAGNETIC POLE LAYER OF THIN FILM MAGNETIC HEAD, METHOD OF FORMING MINIATURE BLOCK PATTERN WITH HIGH ASPECT RATIO ON BOTTOM PART OF STEP ON SURFACE WITH STEP, AND THIN FILM MAGNETIC HEAD

(75) Inventor: Daisuke Iitsuka, Osaka (JP)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/449,179

(22) Filed: Nov. 24, 1999

(30) Foreign Application Priority Data

Nov. 27, 1998 (JP) ............................................. 10-338034

(51) Int. Cl.[7] .............................. G03C 5/00; G11B 5/31; B44C 1/22
(52) U.S. Cl. .................... 430/320; 360/317; 29/603.16; 216/22; 216/39
(58) Field of Search ................................ 430/313, 316, 430/320; 360/317; 29/603.16; 216/22, 39

(56) References Cited

U.S. PATENT DOCUMENTS 6,154,347 A * 11/2000 Sasaki ......................... 360/317

FOREIGN PATENT DOCUMENTS

| JP | 2000-195017 | * 7/2000 |
| JP | 2000-276704 | * 10/2000 |

* cited by examiner

Primary Examiner—Shean C. Wu
(74) Attorney, Agent, or Firm—Burgess & Bereznak, LLP

(57) ABSTRACT

An apparatus and method for formation of the upper magnetic pole layer of a thin film magnetic head. The presently described method for formation of the upper magnetic pole layer of a thin film magnetic head enables the formation with submicron precision of a resist layer for use in forming the upper magnetic pole layer, which must necessarily be formed on a surface having a step, which can contribute to further improvement of areal recording densities. A frame for use in forming the upper magnetic pole layer is formed from multiple resist layers, and the relatively thick lower resist layer is formed by a vacuum thin film formation method.

9 Claims, 9 Drawing Sheets

METHOD FOR FORMATION OF UPPER MAGNETIC POLE LAYER OF THIN FILM MAGNETIC HEAD, METHOD OF FORMING MINIATURE BLOCK PATTERN WITH HIGH ASPECT RATIO ON BOTTOM PART OF STEP ON SURFACE WITH STEP, AND THIN FILM MAGNETIC HEAD

BACKGROUND OF THE INVENTION

1. Field of the Invention

This invention concerns a method for formation of a miniature block pattern with high aspect ratio on the bottom part of the step on a surface having a step, and in particular concerns a method for formation of the upper magnetic pole layer of a thin film magnetic head capable of high recording densities and having an upper pole which is a miniature block pattern with high aspect ratio.

2. Background Information

Composite heads which integrate a magnetoresistance effect head for reproduction with an inductive head for recording are generally employed as the thin film magnetic heads incorporated into hard disk devices for computers. As exemplified in FIG. 6, in these composite heads, after forming a magnetoresistance effect head 9 provided with a magnetoresistance effect element film 6 between upper and lower shield layers 4, 8 separated by reproduction gap layers 5, 7 on the surface of a substrate (slider) 2 covered with a nonmagnetic undercoat 3, the inductive head 17 is formed with the upper shield layer 8 as a common pole (the lower magnetic pole layer).

This inductive head 17 is obtained by forming by layering in order, on the common pole 8, multiple component layers including a recording gap layer 10, an insulating layer 11 to serve as the coil base, thin film coil layers 12, 14, insulating layers 13, 15 covering said coil layers 12, 14, and an upper magnetic pole layer having a pole part 16a and yoke part 16b.

In order to accommodate higher linear recording densities on hard disks, multiple component coil layers are used in order to generate a stronger magnetic field in the recording gap, as shown in FIG. 6. Due to the configuration characteristic of said thin film inductive head, on the surface on which the upper magnetic pole layer 16 is formed by layering, a comparatively large step occurs between the exposed surface Sp of the gap layer on which the pole part 16a is formed by layering, and the upper surface Sy of the coil insulating layer 15 on which the yoke part 16b is formed by layering, as shown in FIG. 7.

In order to form, on a surface with this step, an upper magnetic pole layer 16 with the prescribed film thickness, ordinarily a plated base film is first deposited, and on top of this photoresist is applied using a spin-coating method; said resist is exposed and developed to pattern it with the planar shape of the upper magnetic pole layer 16, and using the patterned resist as a frame, magnetic material is usually grown to a prescribed film thickness on top of the exposed plated base film by an electroplating method.

It is required that the pole part of the upper magnetic pole layer of recording heads be formed with high precision with a core width of less than 1 μm, in order to conform to the narrow track widths of reproduction heads using newly developed giant magnetoresistance effect films, represented by spin valve films.

However, the upper magnetic pole layer must have a certain film thickness in order to secure a sufficient saturation flux density, but in forming a frame using the aforementioned single-layer photoresist, it is difficult to achieve submicron-order precision due to spreading and other phenomena during exposure and development.

SUMMARY OF THE INVENTION

An apparatus and method of forming an upper magnetic pole layer of a thin film magnetic head having a pole part and a yoke part is disclosed. In one embodiment, the method includes forming by layering an approximately flat lower magnetic pole layer, a magnetic gap layer, at least one thin film coil layer, and an insulating layer covering the at least one coil layer, of a plated base film, on a surface of a substrate. Next, a first resist layer of approximately uniform film thickness over an entirety of the plated base film is formed by vacuum thin film formation. A relatively thin second resist layer is formed on top of the first resist layer. The second resist layer is patterned in a planar shape of the upper magnetic pole layer. The first resist layer is patterned by anisotropic dry etching using the patterned second resist layer as a mask. The upper magnetic pole layer is formed by wet plating on an exposed region of the plated base film using the patterned first resist layer as a frame.

BRIEF DESCRIPTION OF THE DRAWINGS

The present invention detailed illustrated by way of example and not limitation in the accompanying figures.

FIG. 9 shows (a) the state of formation by layering of three resist layers; (b) the state in which the upper resist layer is patterned; (c) the state in which the intermediate layer is patterned; (d) the state in which the lower resist layer is patterned; (e) the state in which the upper magnetic pole layer is formed; (f) the state in which the resist is removed.

Figure 1:
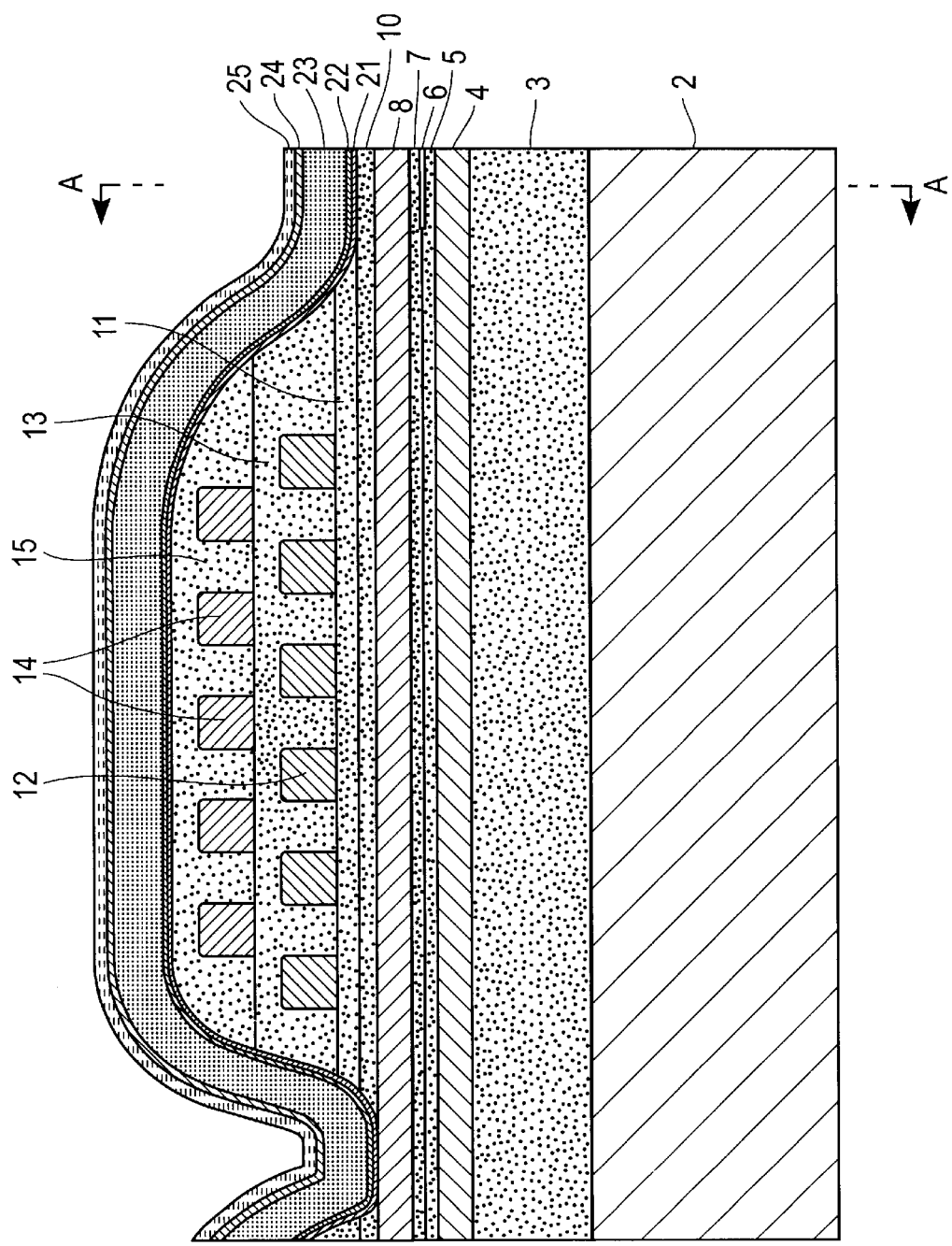
FIG. 1 is a vertical cross-sectional diagram showing the process of formation of the upper magnetic pole layer of a thin film magnetic head of the first embodiment of this invention.

Explanation of Symbols 1 Thin film magnetic head 2 Substrate (slider) 10 Recording gap layer 12 Coil layer 13 Insulating layer 14 Coil layer 15 Insulating layer 16 Upper magnetic pole layer 16a Pole part (miniature block with high aspect ratio) 16b Yoke part 21 Plated base film 22 Adhesive layer 23 First resist layer 24 Second resist layer 25 Photoresist layer (upper resist layer)

DETAILED DESCRIPTION

In one embodiment, the present invention provides a method for formation of the upper magnetic pole layer of a thin film magnetic head which can contribute to further improvement of areal recording densities, a method of forming a miniature block pattern with high aspect ratio on the bottom part of the step on a surface with a step, and a thin film magnetic head accommodating high recording densities, by taking measures to enable the patterning, with submicron precision, of a layer used to form the upper magnetic pole layer, which must necessarily be formed on a surface with a step.

In one embodiment, the present invention provides improvements to the three-layer resist methods, two-layer resist methods and other multilayer resist methods known as VLSI manufacturing techniques, and provides a method, which is useful for formation of the upper magnetic pole layer in thin film magnetic heads accommodating high recording densities, for formation of a miniature block pattern with high aspect ratio on the bottom part of the step in a surface having a step.

In the three-layer resist method which is widely known, in order to obtain a high-resolution pattern with a high aspect ratio, first a relatively thick organic resist layer is formed by the spin-coating method. On top of this a thin intermediate layer is formed from an inorganic material, of which silicon dioxide is representative, by layering, and on top of this a thin photoresist layer is formed. This topmost resist layer is patterned by photolithography, and is then used as a mask in selective removal of the intermediate layer by reactive ion etching using $CHF_3$ (trifluoromethane) or some other reactive gas. Thereafter the organic resist layer is patterned by reactive ion etching using $O_2$ (oxygen) or some other species. In the two-layer resist method, a thin photoresist layer containing Si is formed on top of the organic resist layer and is patterned; this is then used as a mask for patterning the organic resist layer by reactive ion etching using $O_2$ or some other species.

Figure 8:
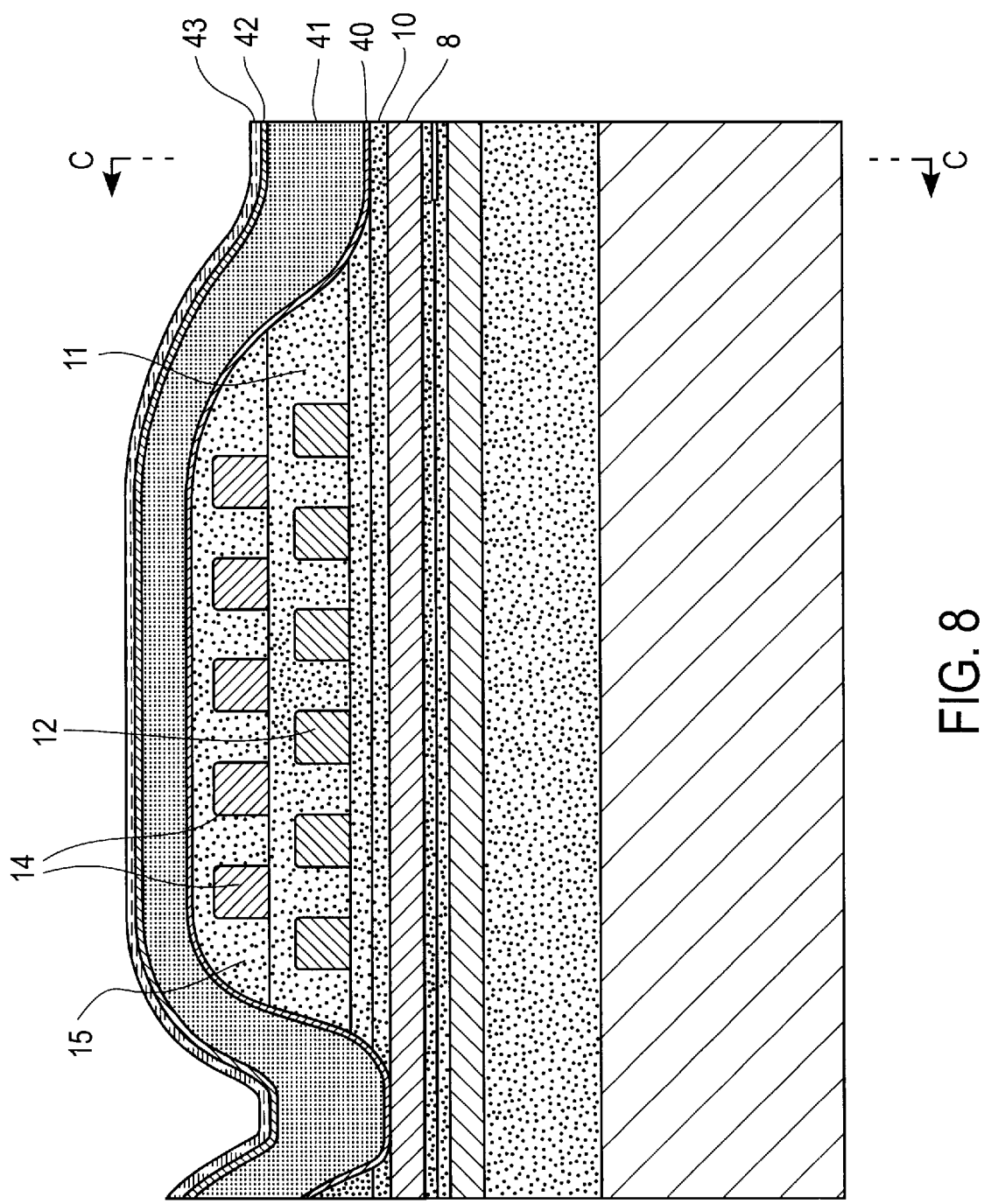
FIG. 8 is a vertical cross-sectional diagram showing the state of application of the widely known three-layer resist method to the formation of the upper magnetic pole layer of the thin film magnetic head shown in FIG. 6 and FIG. 7.
Figure 9:
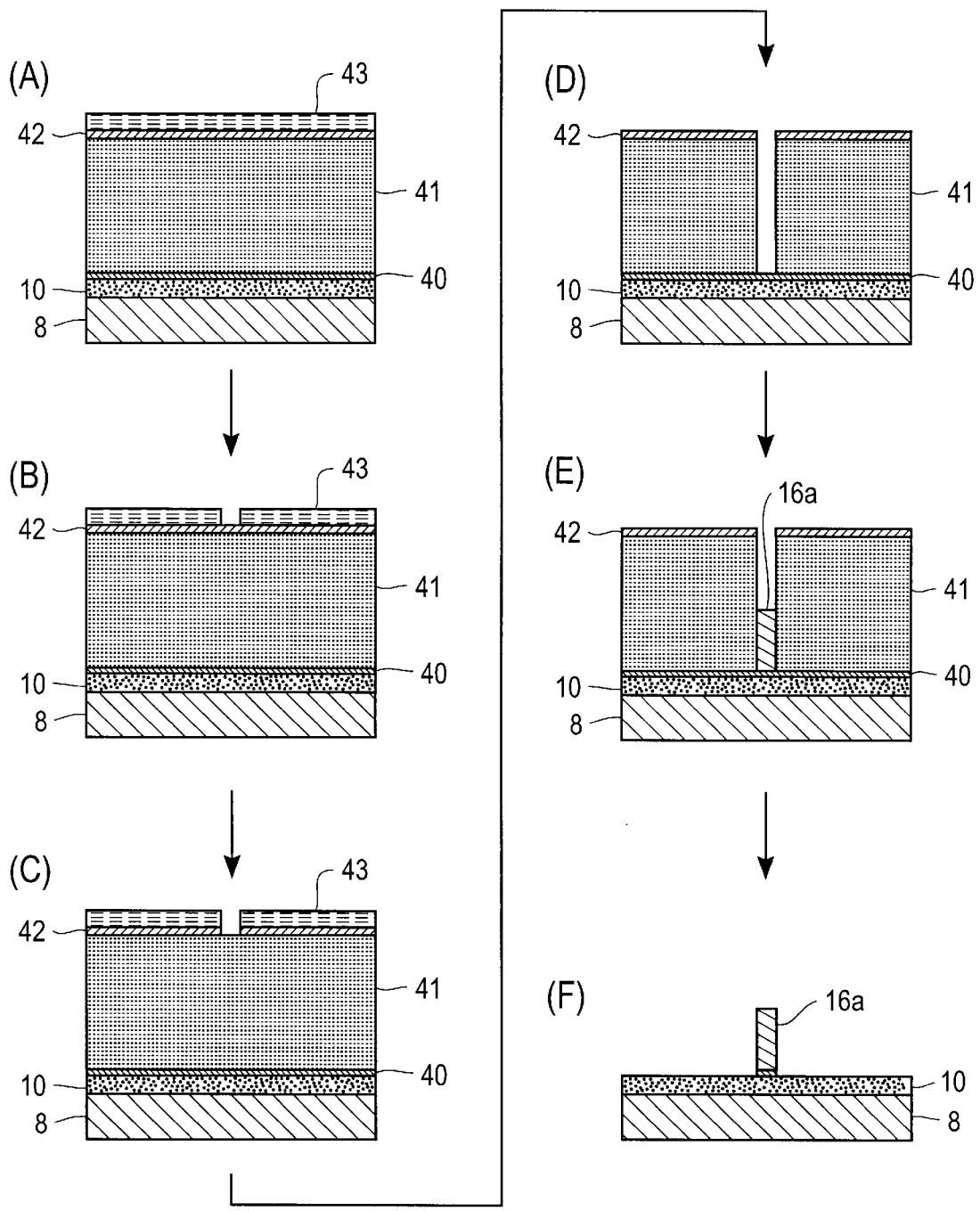
FIG. 9 is a cross-sectional diagram corresponding to the cross-section along line C—C in FIG. 8 showing the process of formation of the upper magnetic pole layer following the state of FIG. 8.

Real examples of the application of this three-layer resist method of the prior art to the formation of the upper magnetic pole layer of a thin film magnetic head are shown in FIG. 8 and FIG. 9. In the figures, the symbol 40 is a plated base film, 41 is a thick organic resist layer (lower resist layer), 42 is a thin $SiO_2$ intermediate layer, and 43 is a thin positive photoresist layer (upper resist layer). As shown in FIG. 9(a), the upper resist layer 43 formed by layering is patterned by exposure using photolithographic techniques and development (FIG. 9(b)). Next, the patterned upper resist layer 43 is used as a mask to transfer the pattern by reactive ion etching of the intermediate layer 42 (FIG. 9(c)). Then, the patterned intermediate layer 42 is used as a mask in etching of the lower resist layer 41 by reactive ion etching (FIG. 9(d)). The lower resist layer 41, patterned in this way, is used as a frame to grow the soft magnetic material on the plated base film 40 by an electroplating method, to form the upper magnetic pole layer 16 (FIG. 9(e)). Thereafter the intermediate layer 42 and lower resist layer 41 are removed by dissolution, and unnecessary parts of the plated base film 40 are also removed (FIG. 9(f)).

Here, if the widely known three-layer resist method is applied without modification to form the upper magnetic pole layer 16, as shown in FIG. 8 and FIG. 9(e), then the lower resist layer 41 is thicker than necessary in the step bottom part, that is, in the part in which the pole part 16a is formed, and is thin in the step top part, that is, in the part in which the yoke part 16b is formed.

Here, submicron precision in the upper magnetic pole layer is required primarily in the pole part 16a, but in the frame used to form this pole part 16a, the lower resist layer 41 must be etched to a greater extent than necessary. Even though reactive ion etching may be an etching method with excellent anisotropic properties, slight undercuts nevertheless occur, so that as explained above, if the lower resist layer 41 is deeply etched the precision in the core width direction of the pole part 16a cannot be secured, and uniform product quality cannot be attained.

To be advantageous in manufacturing, the height of the frame used to form the upper magnetic pole of a thin film magnetic head should be made as small as possible.

This invention, based on this knowledge, provides a method for formation of an upper magnetic pole layer of a thin film magnetic head having an approximately flat lower magnetic pole layer, a magnetic gap layer, at least one thin film coil layer, an insulating layer covering said coil layer, and an upper magnetic pole layer having a pole part and a yoke part; characterized by the formation, on the surface of a substrate on which are formed by layering the aforementioned lower magnetic pole layer, magnetic gap layer, coil layer and insulating layer, of a plated base film; by the formation of a first resist layer of approximately uniform film thickness over the entirety of said base film by vacuum thin film formation methods; by the formation on top of said layer of a relatively thin second resist layer; by the patterning of said second resist layer in the planar shape of the upper magnetic pole layer; by the patterning by anisotropic dry etching of the first resist layer, using the patterned second resist layer as a mask; and by the formation, by a wet plating method, of the upper magnetic pole layer on the region of the exposed plated base film, using the patterned first resist layer as a frame.

In this way, by forming the first resist layer to serve as the frame for plating formation of the upper magnetic pole layer by vacuum evaporation deposition, sputtering or other physical vapor deposition (PVD) method, by chemical vapor deposition (CVD) or by other vacuum thin film formation methods (vacuum plating methods), the film thickness is approximately uniform compared with formation by spin coating, the amount of undercutting in patterning of the first resist layer by reactive ion etching or other anisotropic dry etching method is reduced, and a pole part with high aspect ratio and with submicron-precision core width can be formed with high precision.

When patterning of the second resist layer is by the two-layer resist method, the second resist layer can be formed using a photoresist containing Si, and this second resist layer can be exposed using photolithography techniques and developed. When using the three-layer resist method, the second resist layer is formed from $SiO_2$ or some other inorganic layer, a thin photoresist layer is formed on top of said second resist layer, this photoresist layer is exposed and developed to pattern it in a prescribed shape, and the patterned photoresist layer is used as a mask in etching of the second resist layer. It is desirable that this etching of the second resist layer be performed by $CHF_3$ reactive ion etching or by some other anisotropic dry etching method.

The aforementioned first resist layer can be formed from carbon or some other material. Depending on the film deposition conditions, the material of the first resist layer can be amorphous carbon or diamond-like carbon. And, as the anisotropic dry etching method used to pattern the first resist layer, if oxygen reactive ion etching is used the reactivity is satisfactory and the etch rate is relatively high, so that the method is advantageous as a method for etching the relatively thick first resist layer.

By forming on top of the plated base film, prior to formation of the first resist layer, an inorganic insulating thin film exhibiting a greater bonding with both the plated base film and with the first resist layer than the bonding of the first resist layer with the plated base film, the etch rate is excellent for the material of the relatively thick first resist layer, and moreover, while selecting a material which can be machined with high precision, even in cases where adhesion of said material to the plated base film, which is a magnetic material, is poor, by providing an inorganic insulating thin film as an adhesive layer, peeling of the first layer is prevented and the occurrence of process faults can be reduced. In this case, by selectively removing the exposed parts of the inorganic insulating thin film using said first resist layer as a mask after patterning the first resist layer and prior to the process of upper magnetic pole layer plating, a prescribed part of the plated base film can be exposed.

In this way, this invention is effective for formation of the upper magnetic pole layer of a thin film magnetic head, and in particular the pole part of the upper magnetic pole layer of the inductive head in a composite thin film magnetic head; however, it is not limited to the upper magnetic pole, and can be widely used whenever forming a miniature block pattern with high aspect ratio in the bottom part of the step of a surface having a step.

In other words, this invention can be represented as a method for forming a miniature block pattern with high aspect ratio on the bottom part of the step in a surface having a step, including a process for forming a plated base film on a surface with a step; a process for forming, by vacuum thin film formation methods, a relatively thick first resist layer with an approximately uniform film thickness across the entire surface; a process for forming a relatively thin second resist layer on top of said first resist layer; a process for forming an etching pattern on the second resist layer of narrow width compared with the thickness of the first film layer; a process for patterning the first resist layer by anisotropic dry etching, using as a mask the patterned second resist layer; and a process for formation of a miniature block pattern with high aspect ratio by a wet plating method in an exposed region of the plated base film on the bottom part of the step, with the patterned first resist layer acting as a frame.

In a thin film magnetic head having a lower magnetic pole layer, a magnetic gap layer, at least one thin film coil layer, an insulating layer covering said coil layer, and an upper magnetic pole layer having a pole part and a yoke part, if the pole part of the upper magnetic pole layer, which is a miniature block pattern with high aspect ratio, is formed by the aforementioned method, then the recording characteristics of thin film magnetic heads for use at high recording densities can be rendered uniform.

Below embodiments of the invention are explained, based on the drawings.

Figure 2:
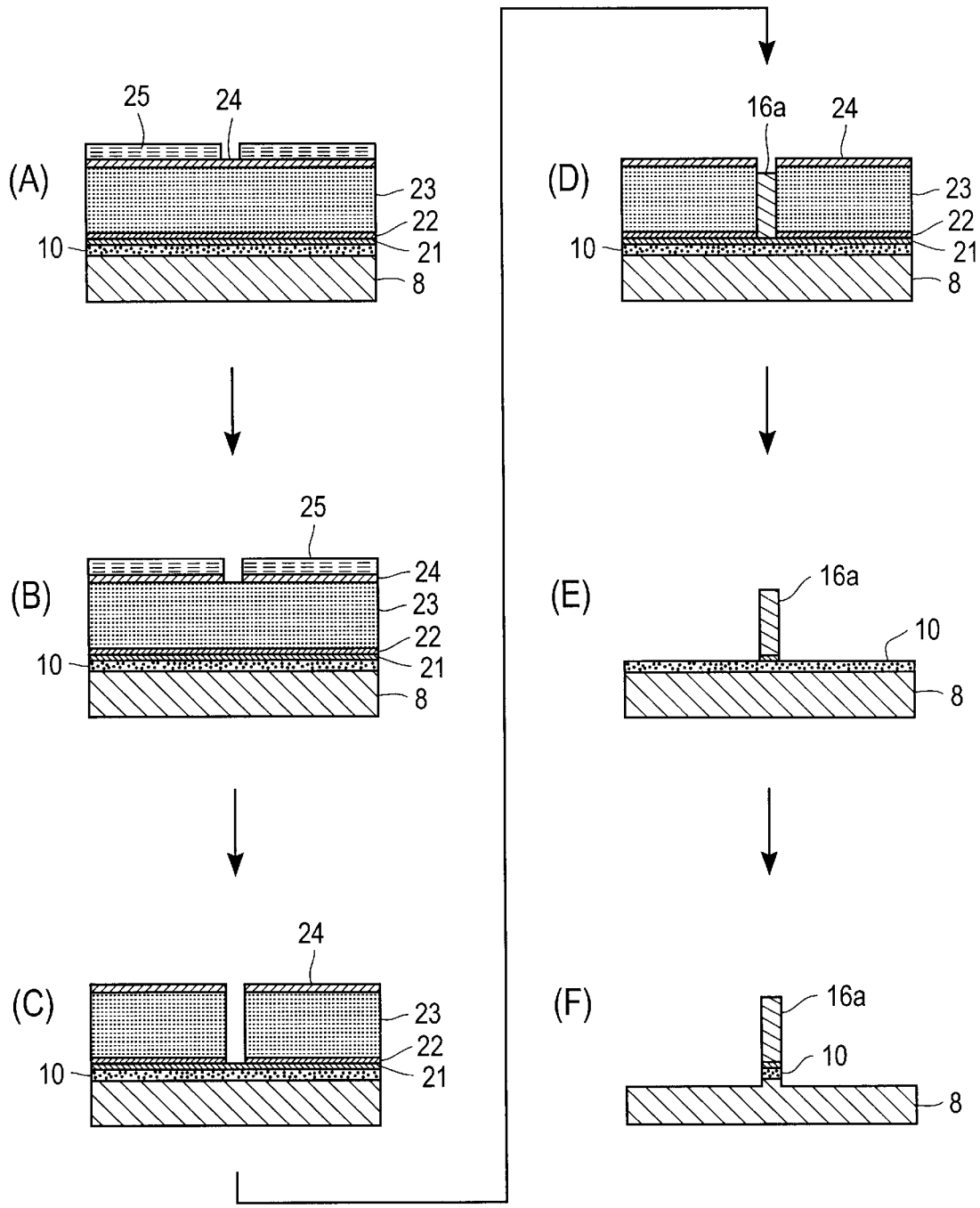
FIG. 2 is a process diagram corresponding to the cross-section along line A—A in FIG. 1, showing (a) the state after the photoresist layer has been patterned; (b) the state after the second resist layer has been patterned; (c) the state after the first resist layer and the adhesive layer have been patterned; (d) the state after formation of the upper magnetic pole layer; (e) the state after removal of layers; (f) the state after trimming of the lower magnetic pole layer.
Figure 3:
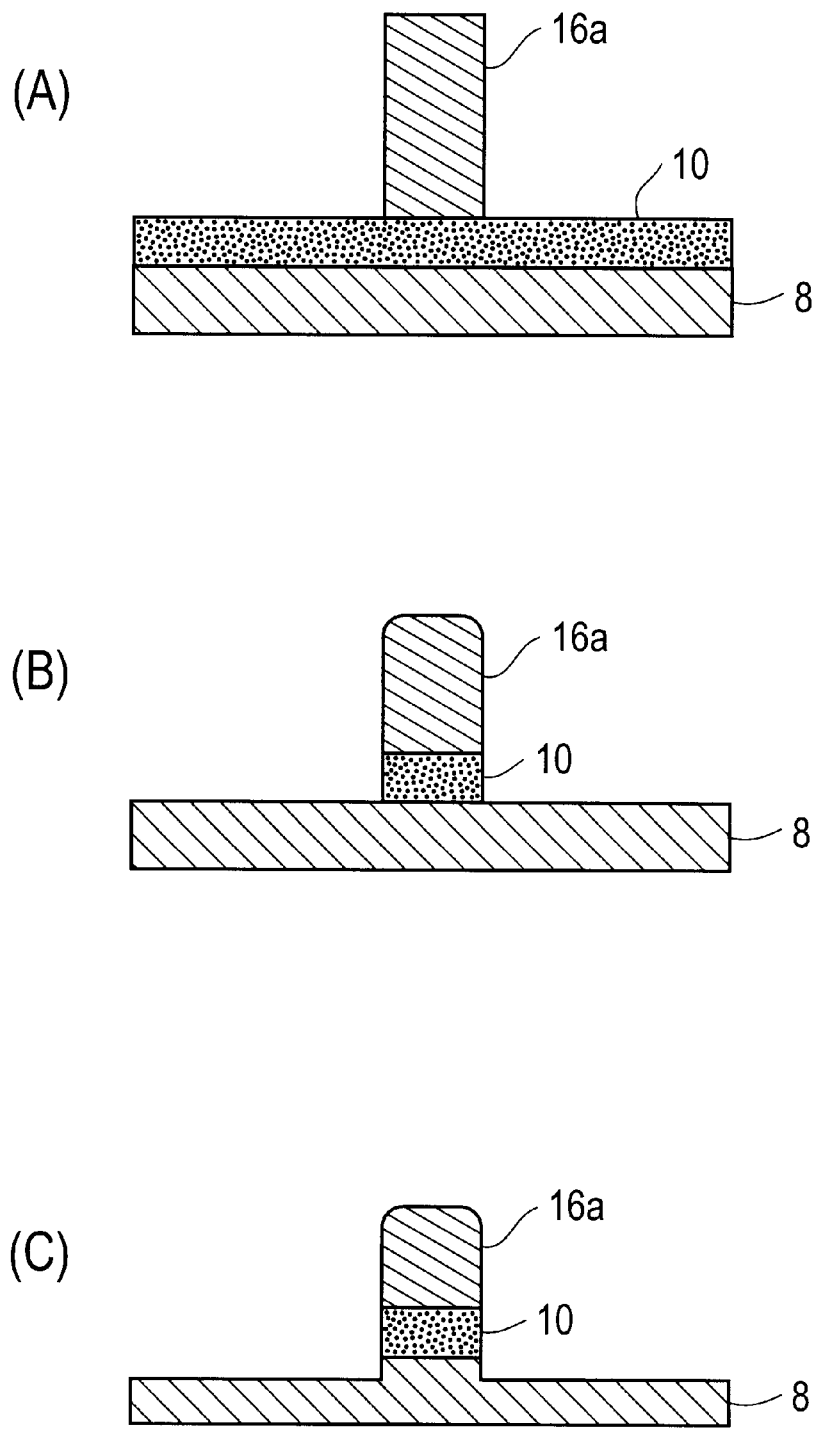
FIG. 3 is cross-sectional diagram showing the lower magnetic pole layer trimming process, showing (a) the state prior to beginning of trimming; (b) the etched state of the recording gap layer; (c) the etched state of the upper part of the lower magnetic pole layer.

FIG. 1 and FIG. 2 show the process of formation of the upper magnetic pole layer 16 of a thin film magnetic head 1 in the first embodiment of this invention. The general construction of the thin film magnetic head 1 to be manufactured is similar to that explained as the prior art, and so the same symbols are attached and a detailed explanation is omitted, but the method of formation of the upper magnetic pole layer 16 which is a feature of this invention is explained in detail.

In order to form an upper magnetic pole layer 16 having a pole part 16a (for example, with core width 0.8 $\mu$m and film thickness 4 $\mu$m approximately), which is a miniature block pattern with high aspect ratio, on the bottom part of the step of a surface having a step, in this embodiment layers up to the recording gap layer 10, coil layers 12 and 14, and insulating layers 13 and 15 covering said coil layers are formed, and are bake-hardened by air baking. Then, a plated base film 21 is formed of NiFe or other ferromagnetic material on the substrate surface. Formation of said film 21 can be by a physical vapor deposition (PVD) method, by a chemical vapor deposition (CVD) method, or by some other vacuum plating method.

Next, the inorganic insulating thin film 22 is formed on the plated base film 21. This inorganic insulating thin film 22 is an adhesive layer with the first resist layer 23 and the plated base film 21; in this embodiment, a vacuum plating method is used to form an $SiO_2$ film 100Å thick. The inorganic insulating thin film 22 exhibits greater bonding with both the plated base film 21 and with the first resist layer 23 than the bonding between the first resist layer 23 and the plated base film 21, is of an electrically insulating material, and can be selectively removed with respect to the plated base film 21 and first resist layer 23, and is not limited to $SiO_2$.

Next, the relatively thick first resist layer with approximately uniform film thickness across the entire surface is formed on top of the inorganic insulating thin film 22 by a vacuum thin film formation method. As the vacuum thin film formation method, in addition to such PVD methods as vacuum evaporation deposition and sputtering, CVD methods can also be used for film formation. It is desirable that the material of the first resist layer 23 be amorphous carbon or diamond-like carbon. In this embodiment, the thickness of the first resist layer 23 is 5 $\mu$m.

Then, the relatively thin second resist layer 24, consisting of $SiO_2$ or some other inorganic material, is formed on top of the first resist layer 23. Vacuum plating methods can also be used for formation of this second resist layer 24. In this embodiment, the film thickness is 2000Å.

Next, a relatively thin photoresist layer 25 is formed on top of the second resist layer 24, for use in patterning said layer 24, and is heat-hardened. This photoresist layer 25 can be applied by spin-coating or some other method. In this embodiment, a positive type organic photoresist was applied to form a film of thickness approximately 1 $\mu$m. FIG. 1 shows the state in which this photoresist layer 25 has been applied.

The materials for the first and the second resist layers 22, 23 should be selected such that the first resist layer 22 can be selectively removed with respect to the second resist layer 23 and plated base film 21, and such that the second resist layer 23 can be selectively removed with respect to the photoresist layer 25, and are not limited to the materials of the aforementioned embodiment.

Next, the photoresist layer 25 is patterned in the prescribed shape using photolithographic techniques (FIG. 2(a)). In other words, the photoresist layer 25 is exposed to follow the planar shape of the upper magnetic pole layer and is developed, in order to etch the region forming the upper magnetic pole layer.

Then, by etching the second resist layer 24 using the patterned photoresist layer 25 as a mask, the pattern is transferred to the second resist layer 24 (FIG. 2(b)). Precise pattern transfer is possible by reactive ion etching of this second resist layer using $CHF_3$ gas or similar; but other methods can also be used. By patterning this second resist layer 24, at the part corresponding to the pole part, that is, at the upper position of the bottom part of the step in the surface on which the upper magnetic pole layer is to be formed, an etching pattern is formed in the second resist layer 24 with the core width of the pole part (which is small compared with the thickness of the first resist layer 23).

Then, the first resist layer 23 is patterned by anisotropic dry etching using the patterned second resist layer 24 as a mask. Oxygen reactive ion etching is one example of anisotropic dry etching, but other appropriate etching methods can be used.

Next, the inorganic insulating film 22 which is an adhesive layer is etched by reactive dry etching or similar, using the patterned first resist layer 23 as a mask, to transfer the pattern to said film 22 as well. FIG. 2(c) shows this state.

By means of the above processes, formation of the frame used to form the upper magnetic pole layer 16 is completed. The upper magnetic pole layer 16 is then formed to the prescribed film thickness by electroplating in a plating solution using the patterned first resist layer 23 as a frame (FIG. 2(d)).

The pole part 16a of the upper magnetic pole layer 16, which is a miniature block pattern with high aspect ratio, is formed in the region in which the plated base film 21 is exposed in the bottom part of the step. By means of this embodiment, the pole part 16a can be formed with high dimensional precision without making the frame height in the part where the pole part 16a is to be formed, that is, the thickness of the first resist layer 23, unnecessarily high.

Thereafter, the aforementioned layers 23, 24 are removed by dissolution, and the inorganic insulating thin film 22, which is an adhesive layer, is removed by appropriate means. Further, by removing the unnecessary parts of the plated base film 21, formation of the upper magnetic pole layer 16 is completed (FIG. 2(e)).

After forming the upper magnetic pole layer 16, by using the upper magnetic pole layer 16 as a mask to trip the aforementioned gap layer 10 and the upper part of the lower magnetic pole layer 8 by reactive ion etching, spreading of the magnetic field occurring between the upper and lower magnetic poles is prevented, and accommodation of high track densities is possible.

Figure 4:
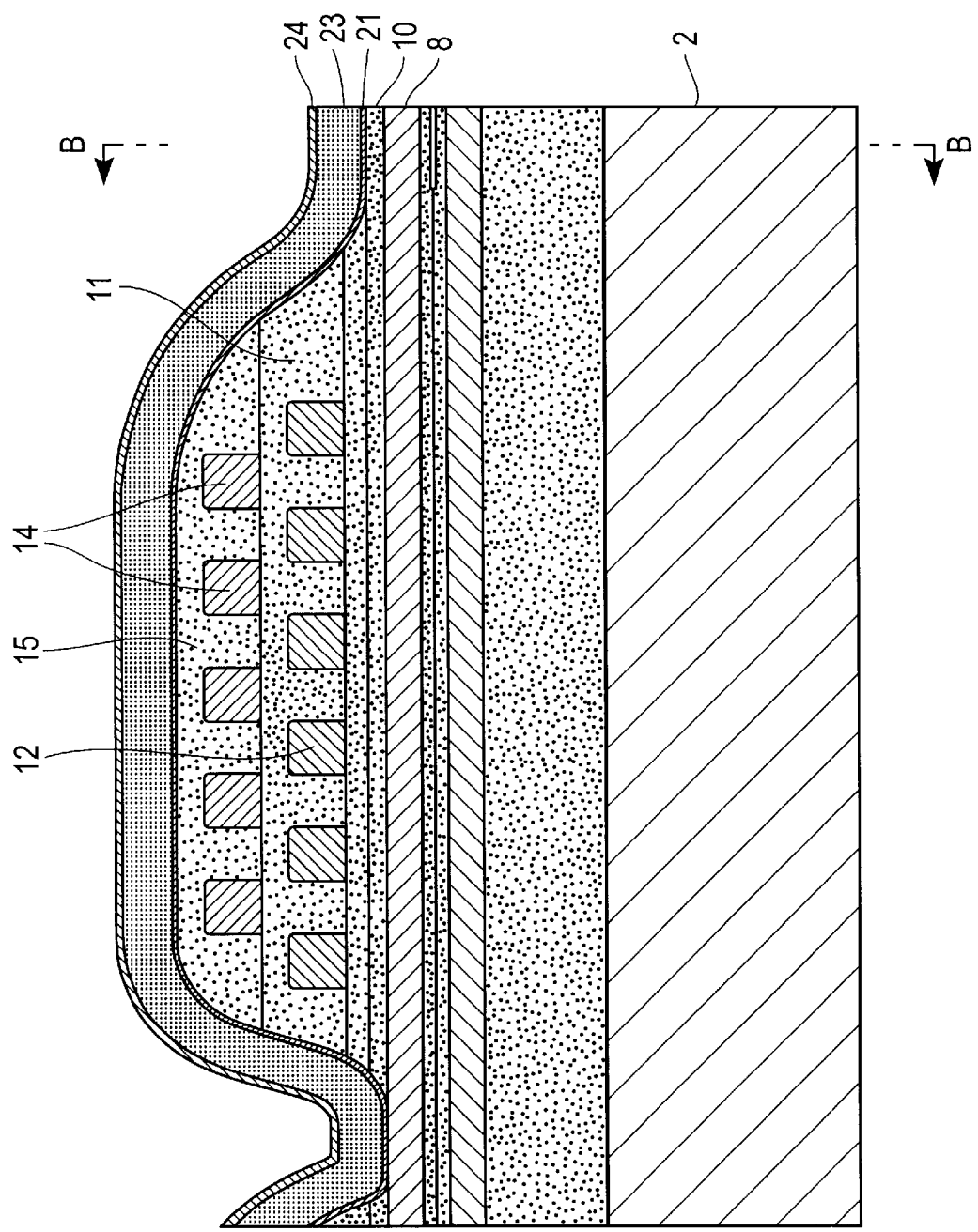
FIG. 4 is a vertical cross-sectional diagram showing the process of formation of the upper magnetic pole layer of a thin film magnetic head of the second embodiment of this invention.
Figure 5:
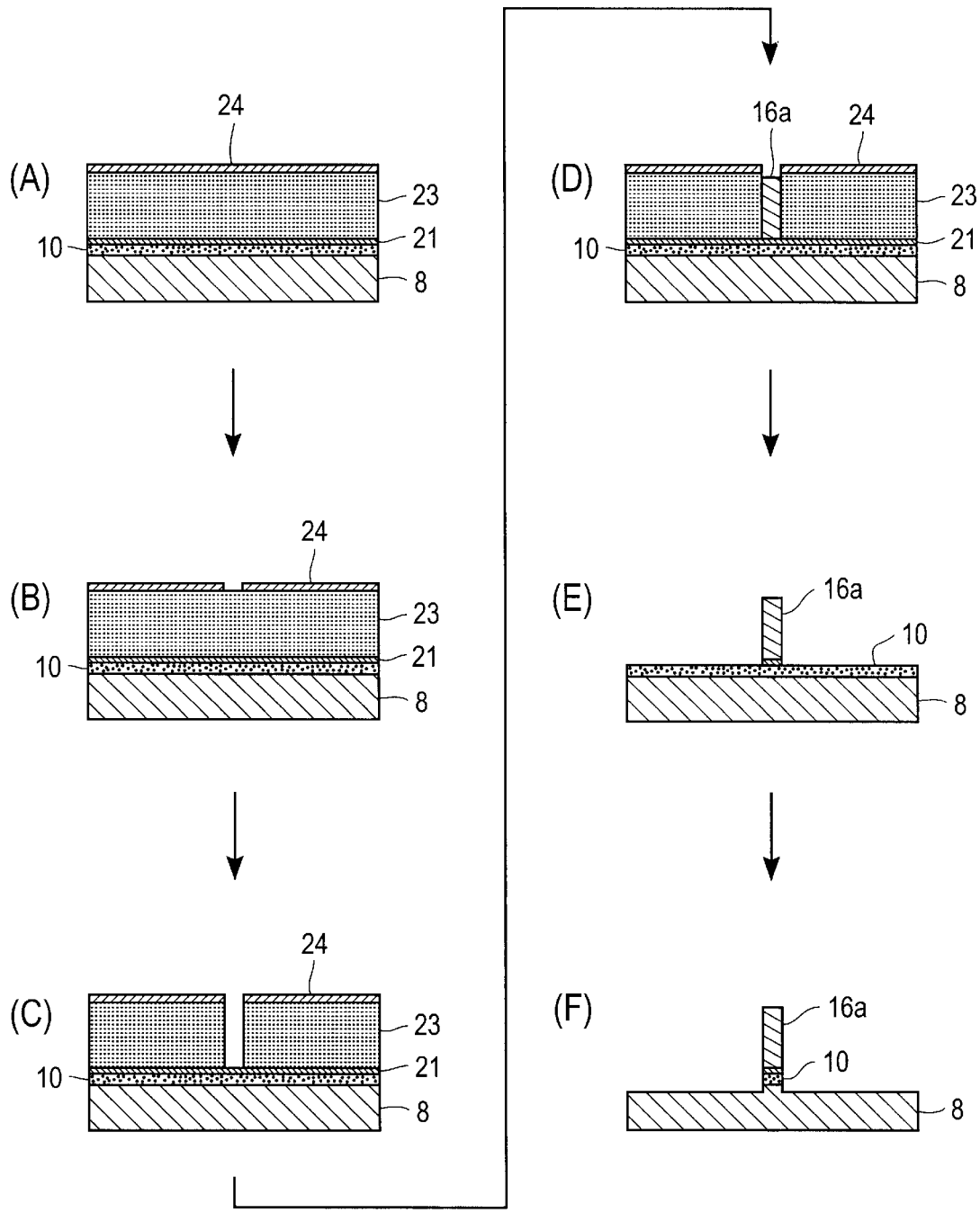
FIG. 5 is a process diagram corresponding to the cross-section along line B—B in FIG. 4, showing (a) the state after layering up to the second resist layer; (b) the state after patterning of the second resist layer; (c) the state after patterning of the first resist layer; (d) the state in which the upper magnetic pole layer is formed; (e) the state after removal of layers; (f) the state after trimming of the lower magnetic pole layer.
Figure 6:
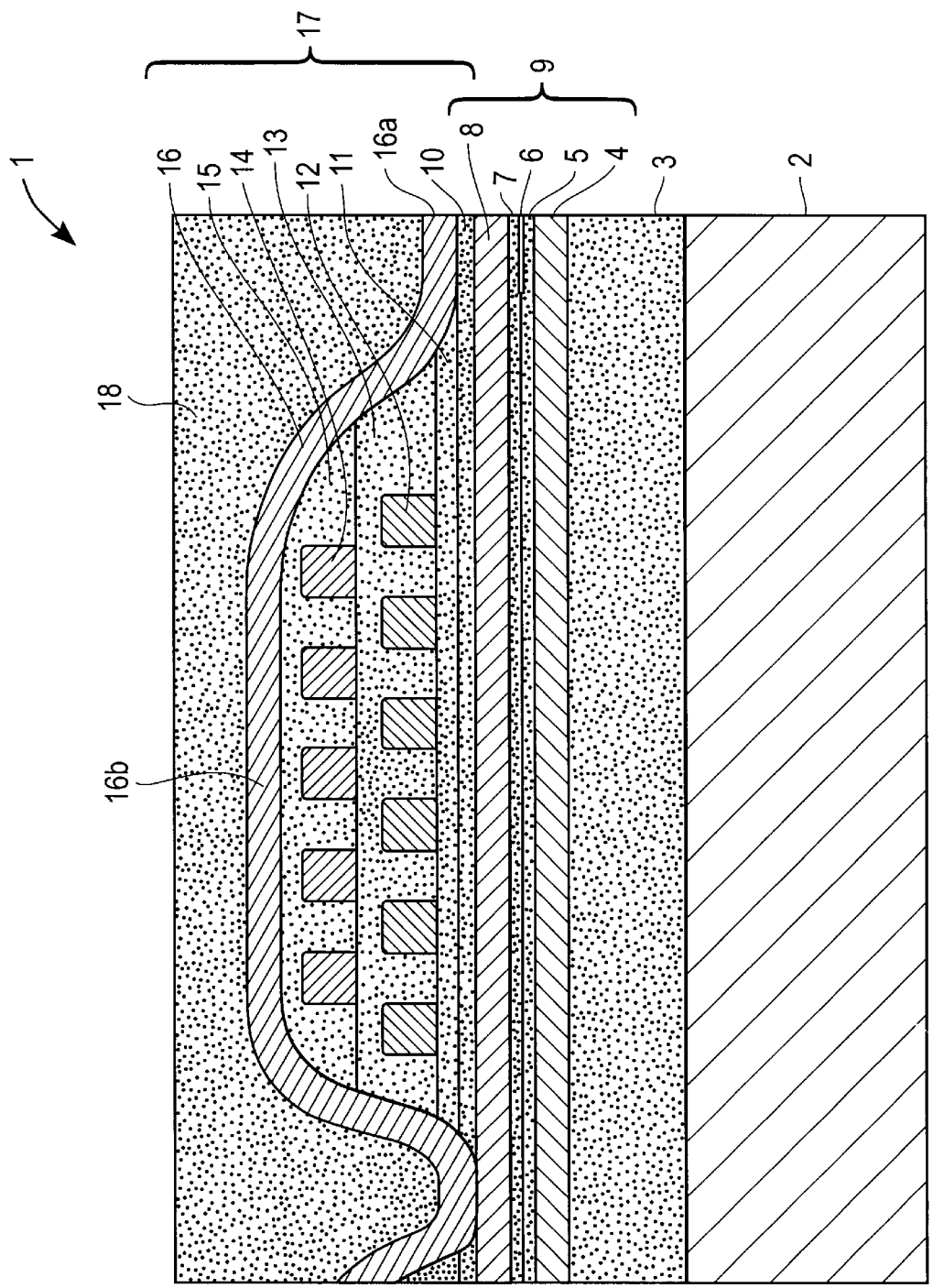
FIG. 6 is a vertical cross-sectional diagram of a composite-type thin film magnetic head.
Figure 7:
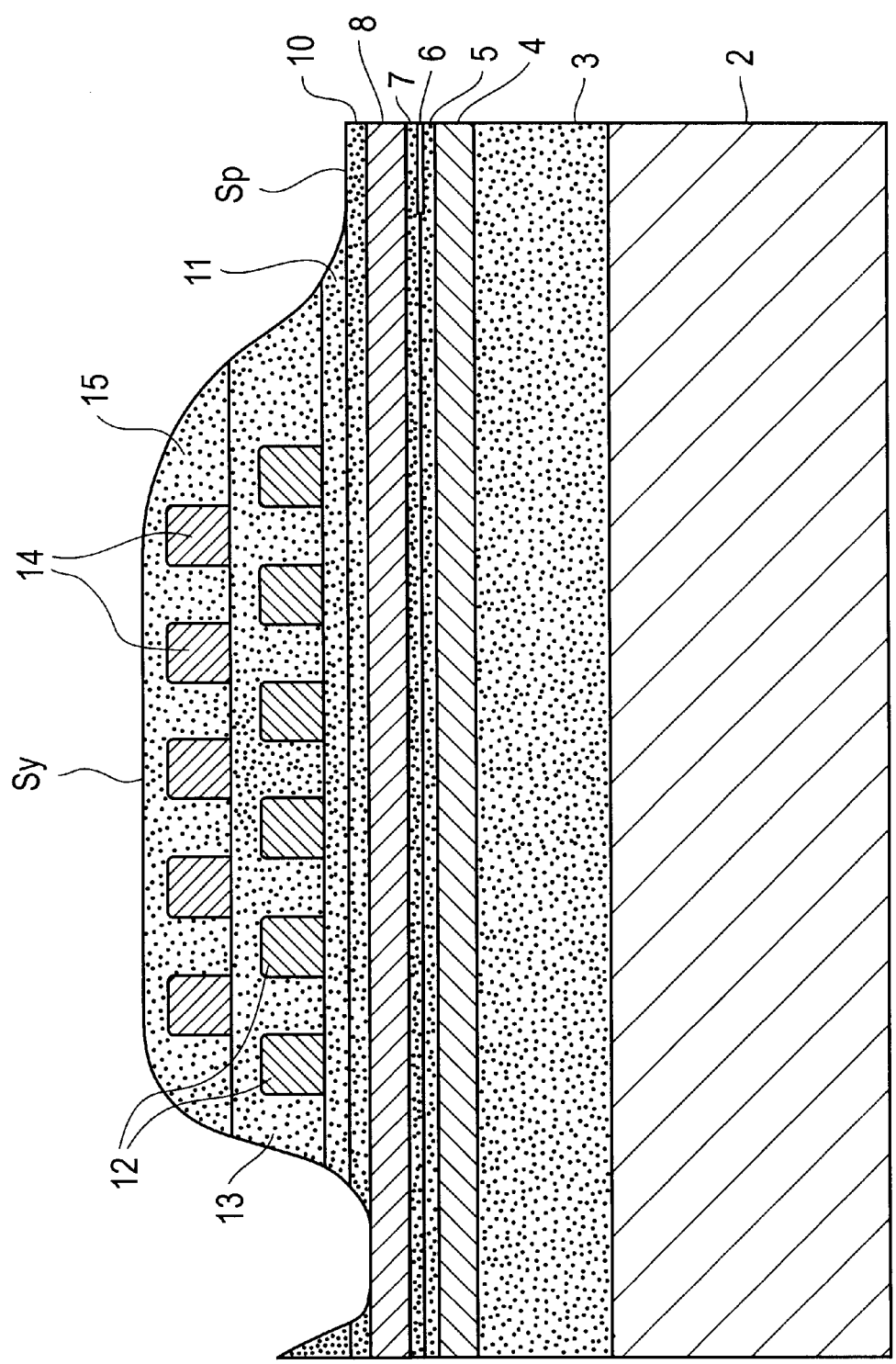
FIG. 7 is a vertical cross-sectional diagram showing an intermediate stage in the manufacture of the thin film magnetic head shown in FIG. 6.

FIG. 4 and FIG. 5 show processes for formation of the upper magnetic pole layer of a second embodiment of this invention. Differences with the aforementioned first embodiment are the method of patterning of the second resist layer 24 and the fact that an adhesive layer is not provided; in other respects the two embodiments are similar, and so the same symbols are attached and detailed explanations are omitted.

In this embodiment, the second resist layer 24 is formed from a positive-type photoresist containing Si. After forming said second resist layer 24 by appropriate means using the spin-coating method (FIG. 5(a)), photolithographic techniques are used to expose and develop the second resist layer 24, to pattern it in the prescribed shape (FIG. 5(b)).

Thereafter, the patterned second resist layer 24 is used as a mask in patterning of the first resist layer 23 by $O_2$ reactive ion etching (FIG. 5(c)). At this time, the Si contained in the second resist layer 24 reacts with the $O_2$, and an $SiO_2$ film is formed at the surface of the second resist layer 24, to function as a mask.

Subsequent processes are similar to those of the aforementioned first embodiment, and so a detailed explanation is omitted.

By means of this invention, the frame used to form the upper magnetic pole layer can be formed approximately uniformly from the pole part to the yoke part, so that a frame in the part where the pole part, which is a miniature block with high aspect ratio, is to be formed, can be formed with high precision, and a thin film magnetic head accommodating high recording densities can be manufactured with uniform quality.

Further, the invention is not limited to upper magnetic pole layers; miniature blocks with high aspect ratio and with submicron widths can be formed with high dimensional precision on the bottom part of the step in a surface with a step.

What is claimed is:

1. A method of forming an upper magnetic pole layer of a thin film magnetic head having a pole part and a yoke part, comprising:

forming by layering an approximately flat lower magnetic pole layer, a magnetic gap layer, at least one thin film coil layer, and an insulating layer covering the at least one coil layer, of a plated base film, on a surface of a substrate;

forming by vacuum thin film formation a first resist layer of approximately uniform film thickness over an entirety of the plated base film;

forming on top of the first resist layer a relatively thin second resist layer;

patterning the second resist layer in a planar shape of the upper magnetic pole layer;

patterning by anisotropic dry etching the first resist layer using the patterned second resist layer as a mask; and forming by wet plating the upper magnetic pole layer on an exposed region of the plated base film using the patterned first resist layer as a frame.

2. The method of forming the upper magnetic pole layer of the thin film magnetic head of claim 1 wherein the first resist layer is formed from carbon.

3. The method of forming the upper magnetic pole layer of the thin film magnetic head of claim 2, wherein the anisotropic dry etching used to pattern the first resist layer includes oxygen-reactive ion etching.

4. The method of forming the upper magnetic pole layer of the thin film magnetic head of claim 1 further comprising:

forming on top of the plated base film, prior to formation of the first resist layer, an inorganic insulating thin film exhibiting a greater bonding with both the plated base film and with the first resist layer than a bonding of the first resist layer with the plated base film;

selectively removing with respect to the first resist layer, after patterning the first resist layer and prior to wet plating the upper magnetic pole layer, exposed regions of the inorganic insulating thin film, with the first resist layer acting as a mask.

5. A method of forming a miniature block pattern with high aspect ratio on a bottom part of a step on a surface with the step, comprising:

forming a plated base film on the surface with the step;

forming on the plated base film a relatively thick first resist layer, with approximately uniform film thickness, across the entire surface by vacuum thin film formation;

forming a relatively thin second resist layer on the first resist layer;

etch patterning the second resist layer with a width narrow compared with a thickness of the first resist layer, at least at upper positions of the bottom part of the step;

patterning the first resist layer by anisotropic dry etching using as a mask the patterned second resist layer; and wet plating in a region of exposure of the plated base film on the bottom part of the step, using the patterned first resist layer as a frame.

6. The method of forming the miniature block pattern with high aspect ratio on the bottom part of the step on the surface with the step of claim 5, wherein the first resist layer is formed from carbon.

7. The method of forming the miniature block pattern with high aspect ratio on the bottom part of the step on the surface with the step of claim 6, wherein the anisotropic dry etching used to pattern the first resist layer includes oxygen-reactive ion etching.

8. The method of forming the miniature block pattern with high aspect ratio on the bottom part of the step on the surface with the step of claim 5, further comprising:

forming, prior to formation of the first resist layer, an inorganic insulating thin film exhibiting a greater bonding with both the plated base film and with the first resist layer than a bonding of the first resist layer with the plated base film; and selectively removing with respect to the first resist layer, after patterning of the first resist layer and prior to wet plating the miniature block pattern, exposed regions of the inorganic insulating thin film, with the patterned first resist layer acting as a mask.

9. The method of forming the miniature block pattern with high aspect ratio on the bottom part of the step on the surface with the step of claim 5, wherein the miniature block pattern with high aspect ratio is included in a pole part of an upper magnetic pole layer having the pole part and a yoke part, the upper magnetic pole layer included in a thin film magnetic head having a lower magnetic pole layer, a magnetic gap layer, at least one thin film coil layer, an insulating layer covering said coil layer, and the upper magnetic pole layer.

* * * * *